United States Patent [19]

Buhrgard

[11] Patent Number: 5,604,734
[45] Date of Patent: Feb. 18, 1997

[54] ATM-SYSTEM ADAPTED THREE STAGE SWITCHING UNIT

[75] Inventor: Magnus K. S. Buhrgard, Bromma, Sweden

[73] Assignee: Telefonaktiebolaget LM Ericsson, Stockholm, Sweden

[21] Appl. No.: 463,559

[22] Filed: Jun. 5, 1995

[30] Foreign Application Priority Data

Jun. 10, 1994 [SE] Sweden .................................. 94 02021

[51] Int. Cl.$^6$ ............................ H04L 12/56; H04J 14/08
[52] U.S. Cl. .......................... 370/388; 370/395; 359/117
[58] Field of Search ............................ 370/53, 54, 58.1, 370/58.2, 58.3, 60, 60.1, 68.1, 94.2, 110.1; 359/123, 124, 117–135, 139, 137, 120, 121, 125

[56] References Cited

U.S. PATENT DOCUMENTS

| | | | |
|---|---|---|---|
| 4,821,225 | 4/1989 | Kobrinski . | |
| 5,077,727 | 12/1991 | Suzuki | 359/123 |
| 5,126,999 | 6/1992 | Munter et al. | 370/60 |
| 5,194,977 | 3/1993 | Nishio . | |
| 5,197,097 | 3/1993 | Takahashi et al. | 370/60 |
| 5,432,627 | 7/1995 | Nishio | 359/117 |
| 5,475,679 | 12/1995 | Munter | 370/60.1 |

FOREIGN PATENT DOCUMENTS

| | | |
|---|---|---|
| 0274800 | 7/1988 | European Pat. Off. . |
| 0400959 | 12/1990 | European Pat. Off. . |
| 0543714 | 5/1993 | European Pat. Off. . |
| 0574864 | 12/1993 | European Pat. Off. . |

OTHER PUBLICATIONS

*ISDN and Broadband ISDN*, Chapter 2, Section 2.3 Space–Division Switching, 1992, William Stallings, pp. 30–34.

"Feasibility Demonstration of a 2.5–Gbit/S 16 × 16 ATM Photonic Switching Matrix", *OFC/IOOC '93 Technical Digest* (Technical Digest of Conference on Optical Fiber Communication), D. Chiaroni et al., pp. 93 and 94.

"Monolithically Integrated 4 × 4 InGaAsP/InP Laser Amplifier Gate Switch Arrays", *Proc. Topical Meeting on Optical Amplifiers and their Applications, postdeadline paper*, 1992, M. Gustafsson et al.

"Characterization of A 1.5 μm Three–Electrode DFB Laser", *European Conference on Optical Communication*, 1990, pp. 279 to 282, by R.J.S. Pedersen et al.

"Performance of DBR Active Filters in 2.4 Gb/s Systems", *European Conference on Optical Communication*, 1991, pp. 445 to 448, by Olof Sahlén et al.

(List continued on next page.)

*Primary Examiner*—Douglas W. Olms
*Assistant Examiner*—Chau T. Nguyen
*Attorney, Agent, or Firm*—Burns, Doane, Swecker & Mathis, LLP

[57] ABSTRACT

The invention is directed to an ATM-System adapted three-step switching unit, including an input circuit including a number of incoming group related conductors connected to a first switching stage, an output circuit including a number of outgoing group related conductors connected to a second switching stage and a third switching stage. A control unit coacts with said switching stages in order to connect one of said incoming conductors with a selected outgoing conductor by way of a connecting path, pointed out through the third switching stage. Each of the outgoing conductors belonging to the first switching stage coacts with an electro-optical converter. The respective connections between the first switching stage and the third switching stage consist of an optical conductor. The third switching stage is adapted to transfer optical information-carrying signals through the connecting path. The connections between the third switching stage and the second switching stage consist of optical conductors and incoming conductors belonging to said second switching stage, which are pre-connected by an opto-electrical converter.

21 Claims, 4 Drawing Sheets

OTHER PUBLICATIONS

"Wavelength Conversion Laser Diodes Application to Wavelength–Division Photonic Cross–Connect Node with Multistage Configuration", *IEICE Trans. Communications*, vol. E75–B, No. 4, Apr. 1992, pp. 267–274, by H. Rokugawa et al.

"Trend of Photonic Switching Systems", *IEICE Trans. Communication*, vol. E75–B, No. 4, Apr. 1992, pp. 235–242, by Shuji Suzuki et al.

"A Class of Directional–Coupler–Based Photonic Switching Networks", *IEEE Transactions on Communications*, vol. 41, No. 4, Apr. 1993, pp. 599 to 603, Andrzej Jajszczyk.

"A Phototonic ATM Backbone Network", New Orleans Supercomm/ICC '94, International Conference on Communications, May 1–5, 1994, New Orleans, Louisiana, Ken–i–chi Yukimatsu, et al., pp. 1346–1351.

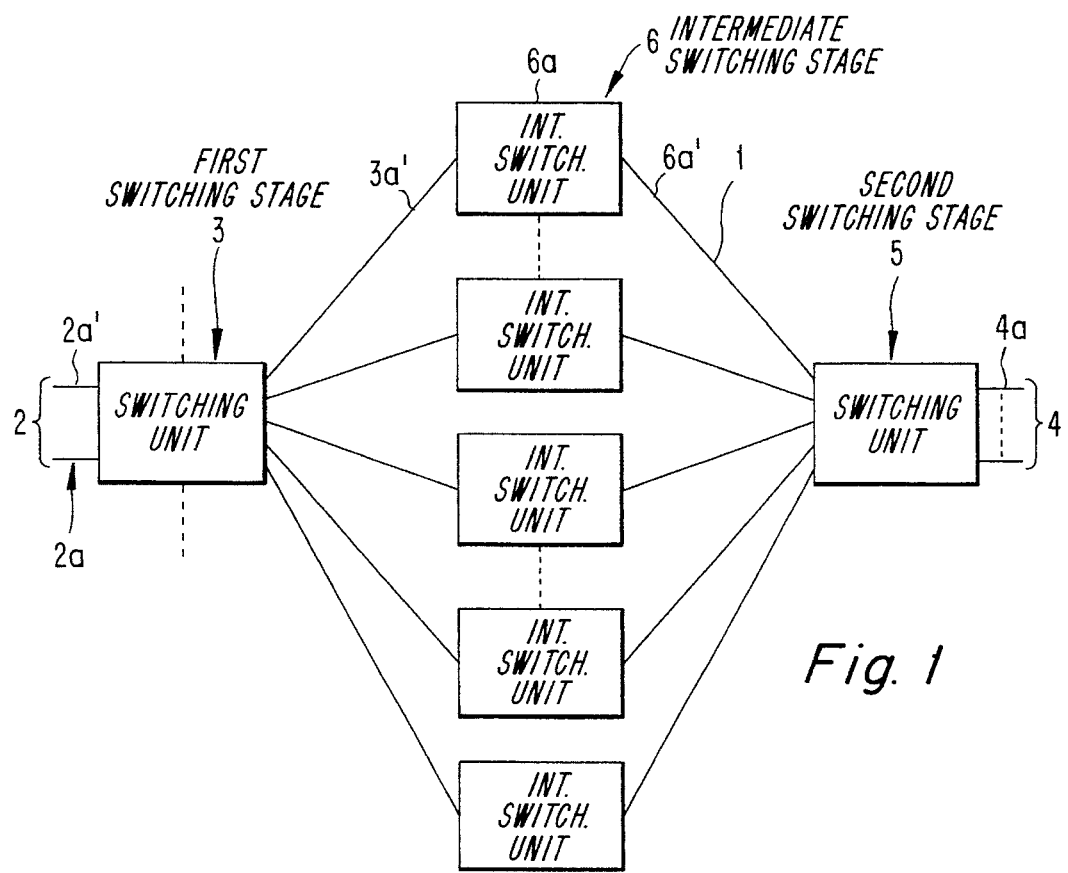
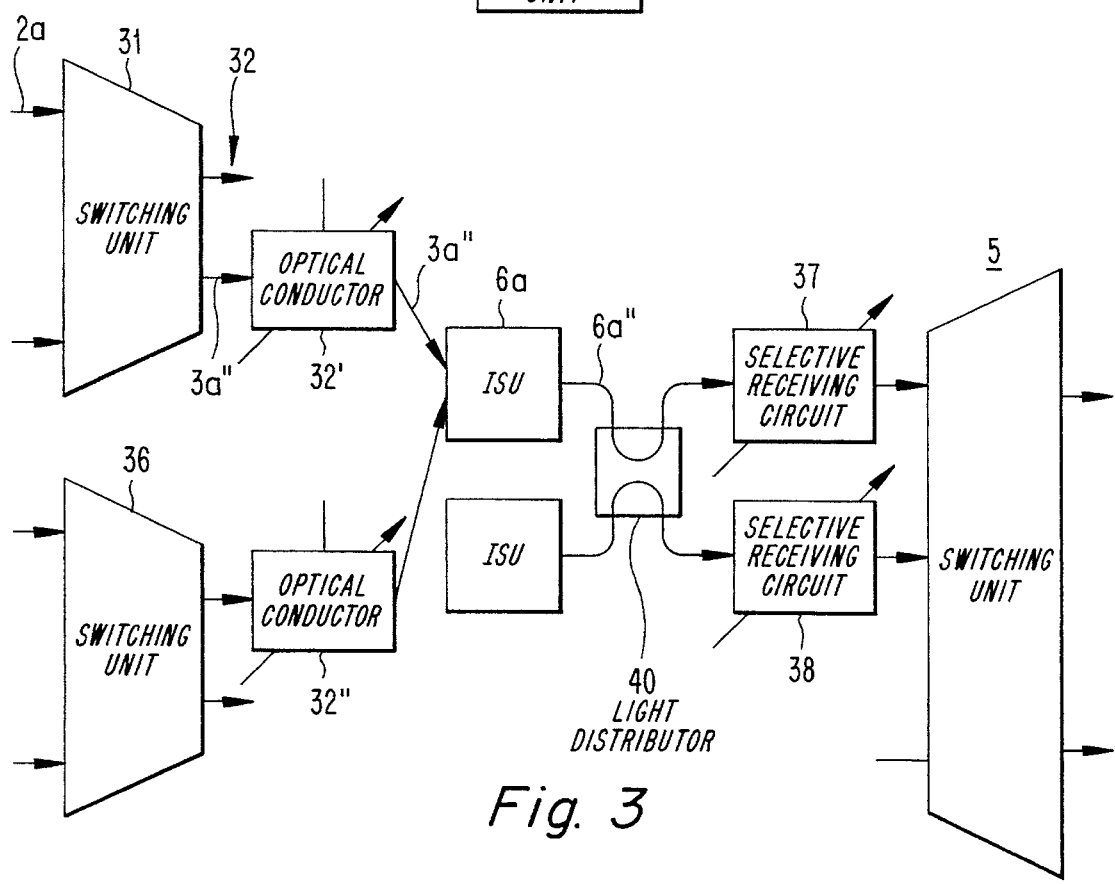

ATM-SYSTEM ADAPTED THREE STAGE SWITCHING UNIT

TECHNICAL FIELD

The present invention relates to a ATM-System adapted three stage switching unit or switching structure and more specifically to such a three stage switching unit that comprises a number of incoming group related conductors connected to an input switching stage or first switching stage, a number of outgoing conductors connected to an output switching stage or second switching stage and an intermediate or between related switching stage or third switching stage related and connectable between said, as an input circuit and output circuit operating, first and second switching stages.

The present invention is further based on such a three stage switching unit where said incoming conductors and outgoing conductors are adapted to transfer electrical information-carrying signals and where a control unit coacts with said switching stages in order to connect one of said incoming conductors with a selected outgoing conductor by means of a connecting path, pointed out through said between related switching stage.

Said input circuits are to present output conductors equipped with electro-optical converters in order to be able to transmit optical pulses, corresponding to a current electrical information-carrying signal, to said between related switching stage and said output circuits presents input conductors equipped with opto-electrical converters in order to receive optical pulses from the between related switching stage corresponding to an information-carrying signal belonging to a current input circuit.

Switching units or switching structures pertaining to this kind with three switching stages has also been denoted a first, second and third switching stage, in a consecutive order, and bearing this in mind it should be noticed that the second switching stage corresponds to the here denoted third switching stage and the third switching stage corresponds to the here denoted second switching stage.

It is, for a man skilled in the art, obvious that such switching units are can handle two-way communication regarding the flow of information but in a simplifying purpose the following description will only disclose one selected direction regarding the flow of information.

DESCRIPTION OF THE BACKGROUND ART

Multi step switching, pertaining to the kind described above, are previously known in a number of various embodiments and the principal construction and the dimensioning rules concerning a none blocking three stage switching unit are shown and described in more detail in the publication "ISDN and Broadband ISDN" under the section 2:3 "Space-Division Switching" and specifically on page 33 with reference to FIG. 2.8.

The principal construction of a three stage switching unit is here described and dimensioned to be able to provide a none blocking signal transmission at a passage of incoming connections.

The structure of used first, second and third switching stages is not given in detail.

It is, nevertheless, known to form said switching stages so that these are adapted to pass used electrical information-carrying digitized signals, whereby electrical conductors are related to each other and structured according to the pattern indicated by the publication.

Taking the significant features of the present invention under consideration it can also be mentioned that it is previously known to be able to receive electrical information-carrying signals and to, through electro-optical converters, convert these to optical pulses of light and to transmit these light pulses on an optical conductor to an opto-electrical converter which receives said optical pulses and transmits corresponding electrical information-carrying signals.

Such optical information-carrying systems have been used within various electro technical applications, such as large switching units, in order to transmit information-carrying signals longer distances, as in between different or similar cubicles.

Taking the significant features, and thereto significant measures, of the present invention under further consideration it can be mentioned that totally optical switching units are previously known and described through the publication "Technical Digest of Conference on Optical Fiber Communication" in the article "Feasibility demonstration of 2,5 Gbit/s 16×16 ATM photonic switching matrix" on pages 93 to 94, by the authors D. Chiaroni et al and the publication "Proc. Topical Meeting on Optical Amplifiers and their Applications, postdeadline paper", 1992, in the article "Monolithically integrated 4×4 InGaAsP/InP laser amplifier gate switch arrays" on pages 38 to 42, by the authors M. Gustafsson et al.

In these referred publications it is described the usage of controllable optical switching components, such as optical switching matrixes, whereby optical light pulses, appearing on one of a number of available group related incoming optical conductors, can be selected and switched through a core to a, one of several available, selected outgoing optical conductor.

In order to simplify the understanding of the features if the present invention a reference to the publication "Proc. European Conference on Optical Communication", 1990, with the article "Characterization of a 1,5 m three-electrode DFB laser" on pages 279 to 282, by the authors R. J. S. Pedersen et al, can be made where it is described a tunable laser related transmitter.

A receiver in a laser related application is described in the publication "Proc. European Conference on Optical Communication", 1991, with the article "Performance of DBR active filters in 2.4 Gb/s systems" on pages 445 to 448, by the authors O. Sahlen et al.

The principles of said transmitter and receiver can be used within the present invention.

That which is shown and described in the following publication is also a part of the related art.

"Wavelength Conversion Laser Diodes Application to Wavelength-Division Photonic Cross-Connect Node with Multistage Configuration" H. Rokugawa et al. IEICE Trans. on Communication, Vol. E75-B, No. 4, April 1992, pages 267–274.

A three stage switching structure or unit is, through this publication, previously known with a principle construction that coincides with the basic conditions of the present invention.

It is here indicated (according to FIG. 1) the use of an opto-electrical signal converting stage (O/E), a stage intended to process electrical signals (ESP), an electro-optical signal converting stage (E/O), a switching stage adapted to optical signals (OSP), an opto-electrical signal converting stage (O/E), a stage intended to process electrical signals (ESP) and an electro-optical signal converting stage (E/O).

An connecting arrangement for the switching stage (OSP) is described in principal with reference to FIG. 2 which is specifically adapted to a wavelength separation, so that signals with different wavelengths can pass simultaneously through one single optical fiber and the conditions to increase the flexibility and capacity of such an optical communication network has thereby been created.

It can be specifically mentioned that the switching stages used here are dimensioned for one and the same capacity and that the optical switching stage (OSP) is dimensioned and adapted to the O/E- and E/O-stages.

The switching unit is thus dimensioned and adapted to a selected capacity and the possibilities to a gradual extension is neither indicated or mentioned.

It is further made clear, through that which is described in FIG. 2, that all outputs are connected to all inputs through the used optical stage.

It is besides this described possibilities to let a selected wavelength from every selected source (1.1–1.n) to an incoming block to be mixed before an optical signal with several wavelengths ($b_1$–$b_n$) is transmitted through an outgoing block.

A separation of wavelengths is thus performed here to a number of possible receivers.

A requirement on an optical switching unit of this kind is that the selected light intensity of the information-carrying signals appearing on one of the inputs must be high enough to be sufficient to all the outputs.

A specially relevant prior art is found in the article "Trend of Photonic Switching Systems" S. Suzuki et al. IEICE, Trans. on Communication, Vol. E75-B, No. 4, April 1992, pages 235–242.

It is here described a number of switching units, intended to be able to transmit broadband signals.

The switching structure according to FIG. 15 can be regarded as being of a certain importance.

It is here described a switching equipment adapted to ATM-system using ATM-cells where the ATM-cells intended to pass through are connected or a multiplexing unit (MUX S/P) which restructure incoming parallel related ATM-cells to a serial related ATM-cell structure on one single conductor and these serial related ATM-cells can be stored within a memory.

Every ATM-cell, regardless of required bandwidth, is now to pass through the optical matrix connection OSM which requires a high speed, meaning that a speed corresponding to ATM-technology is here required through the complete connecting system.

A control of the OSM-stage is required so that, for every ATM-cell that is to pass through the OSM-stage, a selected input connection can be connected with a selected output connection.

SUMMARY OF THE INVENTION

TECHNICAL PROBLEMS

Taking the related art, as described above, under consideration it ought to be regarded as a technical problem to be able to create an ATM-System adapted three stage switching unit with a first, a second and a third switching stage, of the kind that has previously been described, and where the incoming conductors and outgoing conductors are to be adapted to transfer electrical information-carrying digitized signals with a high speed, under the conditions that the intermediated or between related or third switching stage requires small space and is simple.

There is a technical problem to realize the simplicity of the three stage switching unit or structure if the third switching stage is adapted to have one and the same connecting path established during an information transmitting sequence between a sender and a receiver having a defined bandwidth demand.

It is considered as a technical problem to realize that there is a solution in simplifying the operation of the three stage switching unit or structure and adapting the switching unit to different capacities in structuring respective switching stage into a number of switching units or switching components.

Besides this it ought to be regarded as a technical problem to be able to realize the importance of selecting the number of output connections of every switching unit within the first switching stage to correspond with the number of switching units within the third switching stage.

It is thereby a technical problem to be able to realize the importance of letting, and the advantages obtained as, every switching unit within the third switching stage is given the same amount of input connections as output connections.

It ought to be, besides this, regarded as a technical problem to be able to realize the simplifications that are provided as the switching units of said between related or intermediated switching stages can be permitted to be totally opto related regarding receiving, directing and transmitting digitized information-carrying signals without the need of any signals to be converted into electrically related information transmission.

There is a technical problem in being able to realize the savings in the switching structure that can be made by letting every outgoing optical conductor, belonging to an optical switching unit, be supplied with a optical signals distributing unit, a unit that divides an optical signal into two equivalent parts (optical split), where the outgoing conductors of the unit, transferring the same optical pulses, thereby can be connected to one input connection or opto-electrical converter each for every switching unit within the second switching stage.

It must also be regarded as a technical problem to, with a three stage switching unit of the above described kind, be able to realize the importance of, and conditions required to let every switching unit, within the between related switching stage, be arranged to be able to receive optical signals directly from each and every one of a number of group related incoming optical conductors and to directly be able to connect optical pulses appearing on an incoming conductor, by means of a control signal generated by a control unit, to one of several available selected outgoing optical conductor and that thereby said control unit generates control signals adapted to the used switching units within the first and second switching stages.

It must also be regarded as a technical problem to be able to realize the advantages that are obtained as within a three stage switching unit it can be permitted that every optical pulse to every switching unit within the third switching stage can be passed on as a transmitted optical pulse, without the need of, for these purposes, amplifying circuits for optical pulses. It must also be regarded to be a technical problem to be able to realize the advantages that can be provided by a three stage switching unit as incoming and outgoing conductors, intended to be used for electrical signals, transfers group related electrical information-carrying signals, structured into data packets, specifically as ATM cells.

There is a technical problem in being able to realize the advantages that are obtained as several data packets, for instance two, given different addresses, can be transferred on the same optical conductor and to adapt an address evaluating circuit, belonging to a receiver, to decide on which of the address related packages that are to be taken care of and which that are to be disposed of and to thereby provide a use of an optical conductor to transfer two additional separate information-carrying digitized signals.

It must also be regarded to be a technical problem to be able to realize and how to accomplish a three stage switching unit that can provide a safe function and a reliable adaption even when the switching units within a first switching stage, structured as an input circuit, are adapted to a total maximum bit rate of more than 50 Gb/s and specifically more than 80 Gb/s.

It must also be regarded as a technical problem to be able to realize the advantages that are obtained by using a control unit which is arranged to activate a connecting path, between a selected input circuit and a selected output circuit through one of said switching units within the third switching stage, which fulfils the required bandwidth depending on the required bandwidth of a connection currently needed by a caller and taking into consideration the selection of one or several wavelengths.

There is also a technical problem in being able to realize the importance of the simplifications that can be expected by letting said control unit control a wavelength selecting unit, belonging to every electro-optical converter of every outgoing conductor from the switching units within the first switching stage, so that the control unit, through said circuit, can select to transmit optical pulses with a first frequency or wavelength or to be adapted to transmit optical pulses of an other frequency or wavelength and at the same time be able to create the conditions that are required to activate receiving circuits, belonging to one or several incoming conductors of output circuits in the switching units, through the control unit, and to thereby provide a usage of an optical conductor for the transmission of two separate information-carrying digitized signals.

SOLUTION

With the intention of solving one or more of the above stated technical problems the present invention is based on a three stage switching unit or switching structure, comprising a number of incoming group related conductors connected to a first switching stage, formed as an input circuit, a number of outgoing group related conductors connected to a second switching stages, formed as an output circuit, a switching stage, related and connectable between said, as an input circuit and output circuit operating, switching stages, whereby said incoming conductors, outgoing conductors and said first and second switching stages are adapted to transfer electrical information-carrying digitized signals and said first and second switching stages are adapted to let an information-carrying electrical signal, appearing on an incoming conductor, pass on to a selected outgoing conductor, selected by a control unit, and said control unit.

The invention uses hereby a control unit arranged to, in a known way, coact with, and control the connecting paths within, said switching stages in order to connect one of said incoming conductors, belonging to the first switching stage, through said first switching stage, said between related switching stage and said second switching stage, with a selected outgoing conductor, belonging to said second switching stage.

The invention is in principle based on that said control unit is adapted, depending upon a required bandwitdh for a call, to activate and establish a connecting path through one of a plurality of switching units within a third switching stage, said control unit is maintaining said connecting path during a complete information transmitting sequence between a sender and a receiver and by a termination of the sequence said connecting path is deactivated.

As further features of preferred embodiments, falling within the scope of the present invention said first switching stage is divided into a number of switching units or switching components, that each and every one of the outgoing conductor's, belonging to respective switching unit, coacts with an electro-optical converter belonging to, or given to, said conductor, that the respective connection between respective first switching stage and respective third switching stage thereby can consist of optical conductors, that the third switching stage is divided into a number of switching stages, each and every one adapted to transfer totally optical information-carrying light pulses, that the connections between respective switching units within the third switching stage and respective switching units within the second switching stage consists of optical conductors and that the incoming conductors, belonging to said second switching stage, are pre-connected by opto-electrical converters.

As proposed embodiments, further falling within the scope of the inventive idea, it is indicated that each output connection, of a switching unit within the first switching stage, is connected to an input connection, belonging to a switching unit within the third switching stage, each.

The number of input connections and output connections of every switching unit within the third switching stage is selected to be the same.

It is further indicated that the switching units within said first switching stage, said second switching stage and/or said third switching stage are structured as a switching matrix or alternatively that said switching units are structured as three stage switching units.

It is further indicated that respective outgoing optical conductor, belonging to the switching units within said third switching stage, is equipped with a distributing unit intended to separate optical signals, where the outgoing conductor of the distributing unit, corresponding to the outgoing conductor of said switching unit, is connected to the incoming conductor of respective opto-electrical converter of respective switching unit within the second switching stage.

It is specifically indicated that each and every outgoing conductor, belonging to said first switching stage, coacts with an electro-optical converter and that the outgoing optical conductor, coordinated with respective electro-optical converter, is connected to an input connection of one of the switching units within said third switching stage.

The number of outgoing optical conductors from each switching unit within the first switching stage is selected to correspond to the number of switching units within the third switching stage and these optical conductors are arranged between the output connections of a selected switching unit and an input each of each and every one of the switching units within said third switching stage.

With such a three stage switching unit, adapted to receive and pass on electrical information-carrying signals, it is hereby indicated by the present invention that every switching unit within the between related intermediated third switching stage is arranged to be able to directly receive optical signals, appearing on each and every one of a number of group related incoming optical conductors, and to directly be able to pass on optical pulses appearing on an incoming conductor, by means of a control signal generated by the control unit, to one of several available selected outgoing optical conductors.

As proposed embodiments, still further falling within the scope of the inventive thought, it is further indicated that every optical pulse, received by one of the switching units within said third switching stage, is to be able to be passed on as a transmitting optical pulse through a selected output from said between related switching unit.

It is, besides this, indicated that incoming and outgoing conductors transfers group related electrical information-carrying signals, structured into data packets as ATM-cells.

The present invention indicates further that the switching units within the first switching stage, structured as an input circuit, are to be adapted to a reception of a total maximum bit rate of at least more than 50 Gb/s.

It is further indicated that through said control unit is every electro-optical converter, belonging to an input circuit, adapted and controlled to transmit optical pulses with a first wavelength and an other input circuit can be adapted to transmit optical pulses of an other wavelength.

ADVANTAGES

The advantages that primarily can be regarded as characterizing for an ATM-System adapted three stage switching unit or structure, with the switching stages formed by a number of switching units, according to the present invention, is that hereby the conditions have been created to provide a three stage switching unit with a simplified embodiment where the simplifications lies partly within the control unit and partly within the use of a totally optical between related or intermediated switching stage, formed by a number of switching units, that provides the possibilities to use a more simple auxiliary equipment than with electrical switching stages, and that besides this can provide simplifications obtained from wavelength multiplexing and/or multiple addressing of data packets by using a unit for every outgoing optical conductor that distributes optical pulses to two conductors.

The switching unit is simplified by the fact that the control unit is maintaining a connecting path through one of the switching units within the third stage during a complete information transmitting sequence.

The primary characteristic features of an ATM-System adapted three stage switching unit, according to the present invention, are set forth in the characterizing clause of the following claim 1.

BRIEF DESCRIPTION OF THE DRAWINGS

A presently proposed embodiment of a three stage switching unit, according to the present invention, will now be described in more detail with reference to the accompanying drawings, in which;

FIG. 1 shows a previously known construction, in principle, of a none blocking three stage switching unit, which principle also is used at this more detailed description of an embodiment of the invention;

FIG. 3 shows a simplified wiring diagram of a switching unit according to FIG. 2 with the use of optical connections or conductors, where light pulses of several wavelengths for the optical information-carrying pulses appear;

DESCRIPTION OF EMBODIMENTS AT PRESENT PREFERRED

A general none blocking three stage switching unit 1 is thus shown with reference to FIG. 1.

Such a three stage switching unit is in principle made out of three switching stages, a first switching stage 3, second switching stage 5 and a between related or intermediated switching stages 6 with a number of switching units or switching components. The dimensioning of the individual switching stages are to be made according to the publication which is mentioned at the beginning of the description in order to obtain a none blocking switching unit, meaning that every arriving call, accepted for passage, is to be able to be connected through the switching unit without internal blocking functions.

Figure 2:
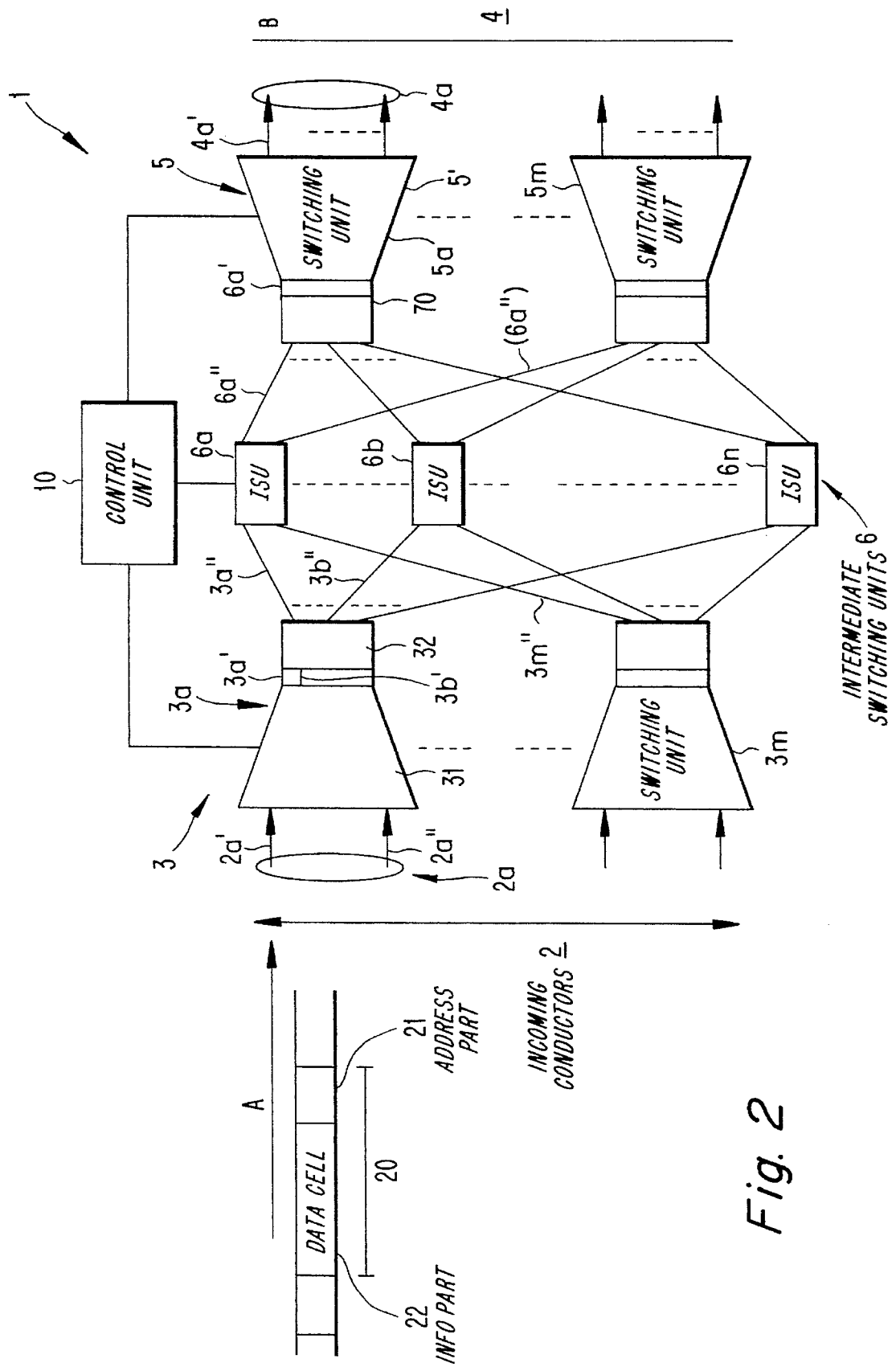
FIG. 2 shows a block diagram of a three stage switching unit which is significant of the present invention.

The embodiment according to FIG. 2 shows a three stage switching unit, according to the invention, comprising a number of incoming conductors 2, where some conductors 2a are group related and connected to the inputs of one of several available switching units 3a, formed as input circuits.

The here illustrated embodiment shows that sixteen (16) such identical switching units 3a–3m can be used distributed over the number of incoming conductors 2a, each and every one adapted to a total maximum bit stream of 80 Gb/s.

Some conductors 4a, the total number of outgoing conductors 4, are group related and connectable to the outputs of one of several available switching units 5a–5m, being a part of the second switching stage 5 and formed as output circuits.

The outgoing conductors 4a of every second switching stage 5 can be adapted to a total maximum bit stream of 80 Gb/s, distributed over the number of connected outgoing conductors 4a.

Comprised are also between related or intermediated switching units 6a–6n, forming the third switching stage 6, connectable between said switching stages 3 and 5 and their switching units 3a–3m and 5a–5m respectively, operating as input circuits and output circuits.

A more detailed description of the required and principal construction of the switching stages 3, 5 and 6 is not necessary since this is previously known. It will nevertheless be mentioned that the switching units within the switching stages 3 and 5 are of a construction which provides the possibilities to let electrical information-carrying pulse related signals to pass through while the switching units within the switching stage 6 are of a construction which will allow the passage of totally optical information-carrying light pulses.

The switching unit 1, according to FIG. 2, is hereby structured so that every information appearing on one of the incoming conductors 2a, for instance the conductor 2a', can be passed through to a selected outgoing conductor, one of several available 3a, for instance the conductor 3a', by means of the structure and the setting of the first switching stage 3, the switching stage 3a within it and through a received control signal, generated by a control unit 10.

In the same way can an other information appearing on an other of the incoming conductors, for instance the conductor 2a", be passed through to a selected outgoing conductor, one of several available 3a, for instance the conductor 3b', by means of the structure and the setting of the first switching stage 3, the switching stage 3a within it and through a received control signal, generated by a control unit 10.

It is of a certain importance that every outgoing conductor, such as the conductor 3a', is connected to an electro-optical converter 41, given to the conductor. Every electro-optical converter of every outgoing conductor is coordinated within a unit 32.

The conductor 3a' is thereby, through its electro-optical converter 41 which is connected to an optical conductor 3a", in connection with an input connection of a switching unit 6a within the third switching stage, an adjacent conductor 3b' is, through its electro-optical converter 42 which is connected to an optical conductor 3b", in connection with an input connection of a switching unit 6b within the third switching stage, and so on to "n" such switching units.

From this it is evident that every switching unit 3a–3m within the first switching stage 3 is to have a number of outgoing conductors and electro-optical converters that corresponds to the number of switching units 6a–6n within the third switching stages 6.

The first optical outgoing conductor 3a" is connected to a first input connection of a first switching unit 6a, a second optical outgoing conductor 3b" is connected to a first input connection of the second switching unit 6b, and so on to the n:th outgoing conductor which is connected to the switching unit 6n.

The first outgoing conductor 3m" of the last switching unit 3m is connected to the last input connection of the switching unit 6a, and so on.

The number of outgoing conductors of every switching unit 3a–3m within the first switching stage 3 corresponds to the number of switching units 6a–6n within the third switching stage 6 and the number of input connections on every switching unit within the third switching stage corresponds to the number of switching units 3a–3m within the first switching stage 3.

The number of switching units within the first switching stage 3 is sixteen and the number of switching units within the third switching stages is thirty-two.

Figure 5:
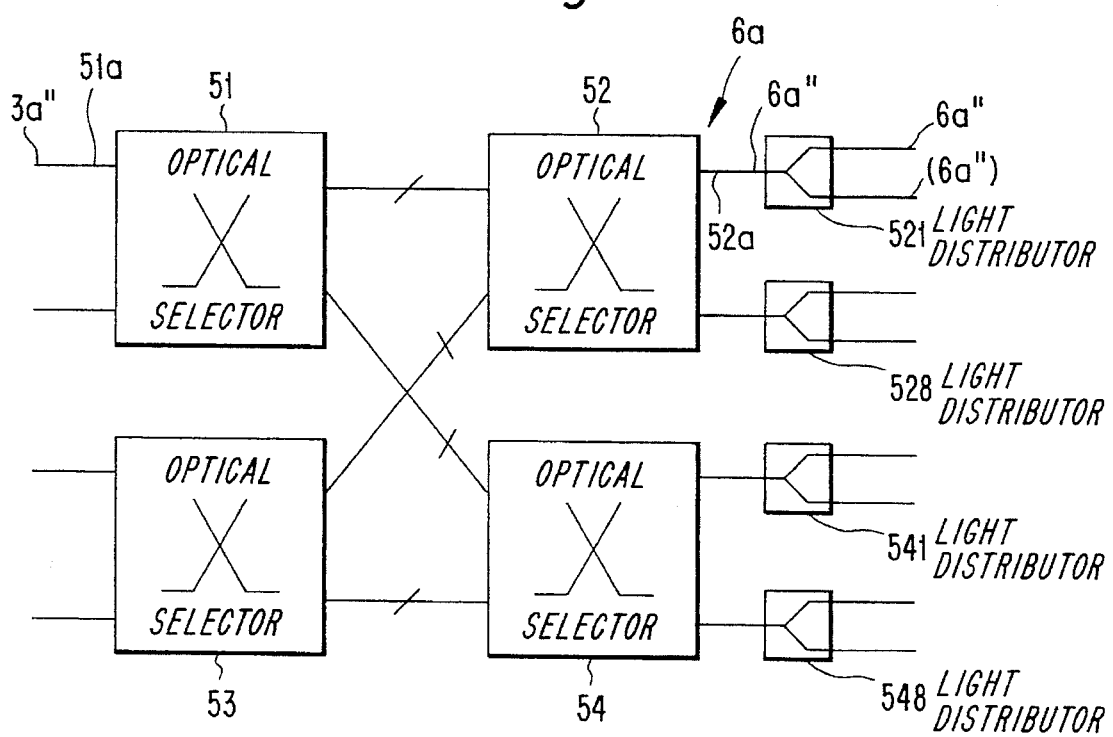
FIG. 5 shows the principle of a third switching stage in the form of a matrix with a unit that distributes optical signals to two conductors given to respective outgoing conductor.

Every input connection 51a of a switching unit 6a within the third switching stage 6 can be connected with one of the sixteen output connections, through the control unit 10, in order to establish a connecting path through this switching unit 6a. The principal construction of a switching unit within the third switching stage, such as the switching unit 6a, is illustrated in FIG. 5.

This switching unit 6a is matrix related with four optical selector elements 51, 52, 53, 54 each and every one previously known.

The switching unit 6a presents two group related elements 51 and 53 equipped with eight optical input conductors each, one of which has been denoted 51a and which can correspond to the optical conductor 3a".

The switching unit 6a presents group related elements 52 and 54 equipped with eight optical output conductors each, one of which has been denoted 52a and which can correspond to the optical conductor 6a".

Each and every one of these sixteen conductors coacts with a light distributor, of which one have been denoted 521, and which distributes incoming light pulses to two parallel related light pulses, one appearing on the conductor 6a" and one on the conductor (6a") and thereby has thirty-two outgoing conductors been provided, each and every one connected to one of thirty-two opto-electrical converters belonging to the sixteen switching units within the second switching stage 5.

The conductor 6a" can, herewith, be connected to the switching unit 5a and the conductor (6a") can be connected to an other switching unit, such as 5m.

FIG. 5 is intended to illustrate that every outgoing optical conductor is equipped with said light distributor, such as 521–528 and 541–548.

Each and every one of the sixteen switching units 5a–5m presents sixty-four input conductors with one opto-electrical converter each (not shown).

The arrangement and advantages of using optical light distributors 521–528 and 541–548 will be described in more detail in the following.

Figure 4:
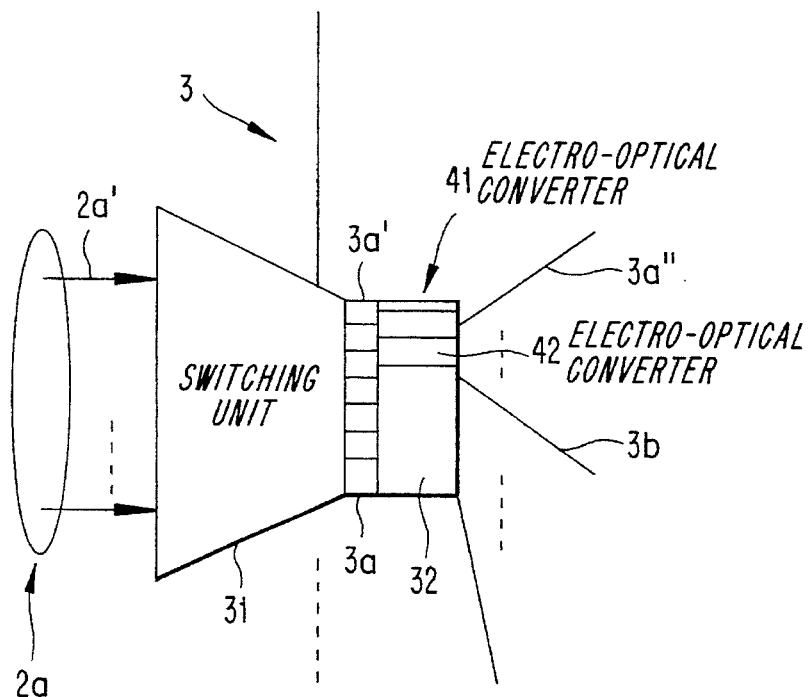
FIG. 4 shows the principle of a first switching stage with an electro-optical converter given to respective outgoing conductor.

The switching units 5a–5m consists of, in the same way as it has been described with reference to FIG. 4, a number of preconnected opto-electrical converters within the circuit 70, with one converter for each optical conductor and input connection.

The optical conductor 6a" can thus be connected with an opto-electrical converter oriented within the circuit 70, whose electrical signals appears on the conductor 6a" and thereafter on the conductor 4a".

The invention is given a specifically suitable application if said incoming conductors 2 and said outgoing conductors 4 are adapted to transmit electrical information-carrying signals in the form of current- or voltage-pulses coordinated into data packets, which in the embodiment is supposed to consist of ATM-cells.

An embodiment is thus illustrated, with reference to FIG. 3, where selected connecting paths through optical conductors, such as 6a", can be used for several signals, "double"-used, through a selection of used wavelength for the light pulses.

For these purposes it is required that, according to FIG. 3, the wavelength selector of the outgoing conductor, for instance 3a", is controlled through the control unit 10 so that respective electro-optical converter is adapted to transmit optical pulses with a first wavelength or optical pulses with a second wavelength on the conductor. If it is supposed that a first wavelength is used in the optical conductor 32' and a second wavelength in the optical conductor 32" then the input connections of the switching unit 6a, belonging to these conductors, are connected to each other to form a single conductor upon which signals with wavelength multiplexing appears and a wavelength selective receiver 37 or 38 can, through the control unit 10, be activated to select desired wavelength to an input circuit of the switching stage 5.

It will thus be that on one of the output conductors 6a" of the switching unit 6a there will be light pulses with two separate wavelengths, that can be separated from each other, in a controlled way, before the second switching unit.

The, of optical pulses, receiving circuits 37, 38 belonging to one or several output circuits, will, through the control unit 10, be controllable to receive information-carrying optical pulses with a selected wavelength and dispose of pulses with an other wavelength.

This technology will not be described further since ATM-technology is well known, where the data packets are structured as ATM-cells with an address related part, "Header", and an information-carrying part, "Pay-load".

It will nevertheless be mentioned that the switching stages 3, 5 and 6 are controlled by a control unit 10 in a way which in itself is very complex.

The following description is only intended to describe the parts of the control unit 10 that is required for an understanding of function of the present invention.

Figure 6:
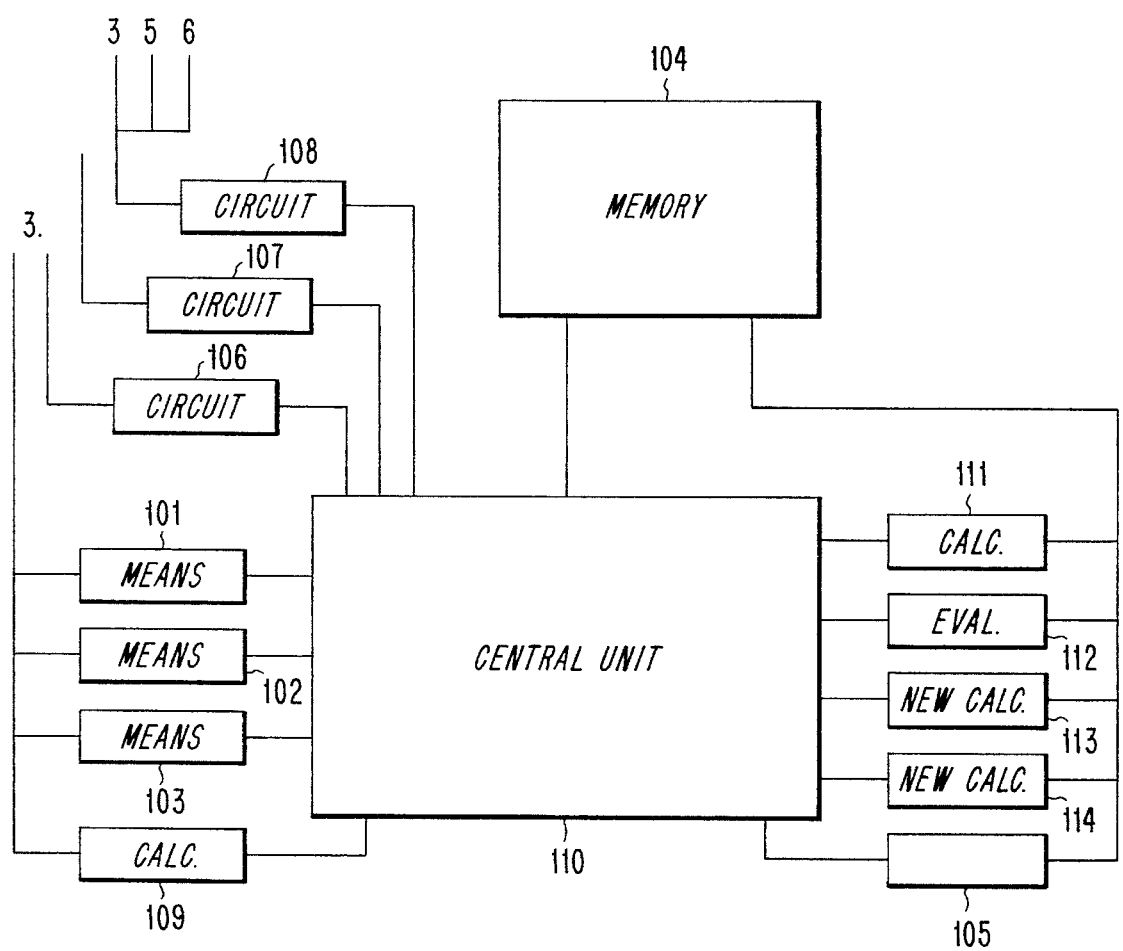
FIG. 6 shows in principle a block diagram of a control unit meant to control a connection of a required connecting path.

The application of the invention with a packet data network and more specifically an ATM-system will now be described in more detail with a further reference to FIG. 2. A control unit 10 is schematically illustrated in FIG. 2 and function as described in more detail in FIG. 6. Said control unit 10 coacts with said switching stages 3 and 5 in order to control the switching units within these and to connect one of said incoming conductors 2a' to a selected outgoing conductor 4a' through one of said between related or intermediated switching units 6a, so that every data cell (ATM-cell) appearing in series on the conductor 2a" can pass through. One data cell 20, among several data cells, presents an address related part 21 and an information related part 22.

At a call the calling party calls for an activation of the switching unit since a transferred ATM-cell presents, in its address related part 21, a channel number which indicates a call and through the information-carrying part 22 it presents required bandwidth for the desired connected connection.

The ATM-cell provides further the information on to what called party the connection is to be done.

The control unit is arranged to be able to activate a connecting path, between a selected input circuit 3 and a selected output circuit 5, belonging to a between related switching unit 6a, that corresponds to the currently required bandwidth. (See FIG. 6).

Electrical information-carrying pulses, appearing on the conductor 2a', are detected and interpreted by means belonging to the control unit 10, one mean 101 intended to indicate a call, one mean 102 in order to establish desired and required bandwidth and one mean 103 to indicate the currently called party (B-caller).

A central unit 110 evaluates in a memory 104 if the required bandwidth can be received by the B-caller in question.

All available connecting paths through the switching units 6a–6n and the instantaneous engagement of each and every one of these are stored within the memory 104.

It is simultaneously evaluated if the B-caller can receive the selected connection. The B-caller is engaged if the evaluation is negative, which is indicated to the calling party, the A-caller, through a circuit 106.

If the evaluation is positive and since there, according to the basic conditions of the structure of the switching unit, can not be any internal blocks, then the B-caller is available and the A-caller is notified, through a circuit 107, that the call is accepted with the selected bandwidth.

The possibilities to engage an already connected optical connecting path, from the switching stage 3 to 5 through one of the switching units 6a–6n, within the third switching stage, and with a required bandwidth, is evaluated through the central unit 110 and a calculating circuit 111.

The selected connecting path is labelled as engaged within the memory 104 if there is a positive result of the calculation.

A new calculating circuit 112 is activated if there is a negative result.

This circuit 112 evaluates the possibilities to use any of the established optical connecting paths in a "double" way, as between i first switching stage and a third switching stage, such as the conductor 3a", or between a third switching stage and a second switching stage.

Such a double-use can be achieved through the use of the optical distributors 521–528, 541–548. One and the same opto-electrical converter receives ATM-cells with separate addresses and only ATM-cells with a selected address are allowed to pass while the rest are disposed of. Another opto-electric converter receives the same stream of ATM-cells but only ATM-cells with an address pertaining to the converter are allowed to pass while the rest are disposed of.

The selected connecting path is labelled as engaged within the memory 104 if there is a positive result of the calculation.

A new calculating circuit 113 is activated if there is a negative result.

This circuit 113 evaluates the possibilities to use any of the established optical connecting paths in a "double" way, as between i first switching stage and a third switching stage, such as the conductor 3a", or between a third switching stage and a second switching stage through multiple wavelengths, described in more detail with reference to FIG. 3.

The selected connecting path is labelled as engaged within the memory 104 if there is a positive result of the calculation.

A new optical connecting path is evaluated through the central unit 110 if there is a negative result and a new calculating unit 114 is activated to point out an available optical connection.

The selected connecting path is labelled as engaged as soon as the central unit 110 can establish a positive result from a calculation and the call (and the A-caller) is, through a circuit 108, given a new internal channel number which corresponds to a selected connecting path, so that all ATM-cells with a stated channel number can pass through an established connecting path and required information is presented to the concerned switching stages 3, 5 and 6, including the activation of selection of wavelength or likewise.

The established connecting path is removed from the memory 104 through a calculating circuit 109 and other information concerning the established connecting path is removed when the A-caller indicates, with a new ATM-cell, that the call is to be disconnected.

It should be noticed that said wavelength selective receivers 37 and 38 are pre-connected with a light distributor 40.

The selection of wavelength within 32' and 32" and within the receivers 37 and 38 is done through the control unit 10.

It can further be mentioned that address evaluating units for ATM-cells are previously known and included in selected switching units within the switching stages 3 and 5.

It will be understood that the invention is not restricted to the illustrated exemplifying embodiments thereof and that modifications can be made within the scope of the inventive thought illustrated in the following claims.

I claim:

1. An ATM-System adapted three stage switching unit, comprising:

an input circuit including a number of incoming group related conductors, wherein every group is connected to a first switching stage;

an output circuit including a number of outgoing group related conductors, wherein every group is connected to a second switching stage;

a third switching stage, related and connectable between said first and second switching stages, whereby said incoming group related conductors and said outgoing group related conductors are able to transfer electrical information-carrying signals;

a control unit which coacts with said switching stages to connect one of said incoming group related conductors with a selected outgoing conductor by means of a connecting path through said third switching stage whereby each of the outgoing conductors, belonging to said first switching stage, coacts with an electro-optical converter and wherein a respective connection between the first switching stage and the third switching stage is an optical conductor, whereby the third switching stage is able to transfer optical information-carrying signals through said connecting path, and the connections between the third switching stage and the second switching stage are optical conductors and the incoming conductors, belonging to said second switching stage, are pre-connected by opto-electrical converters wherein, based upon a required bandwidth for a call, said control unit is able to activate and establish a connecting path through one of a plurality of switching units within the third switching stage, said control unit being activated to maintain said connecting path during a complete information transmitting sequence and deactivated to terminate said connecting path by the end of the sequence.

2. Three stage switching unit according to claim 1, wherein all ATM-cells having a predetermined address and bandwidth requirement appearing on any of the incoming conductors to a switching unit of the first stage are connected to a selected outgoing conductor related to said first switching stage.

3. Three stage switching unit according to claim 1, wherein said first switching stage consists of a number of switching units, each able to present the same number of outgoing conductors, said second switching stage consists of a number of switching units, each able to present the same number of incoming conductors; said third switching stage including a number of switching units, each able to present the same number of incoming conductors as outgoing conductors and wherein the number of outgoing conductors from a switching unit within the first switching stage is selected to correspond to the number of switching units within the third switching stage.

4. Three stage switching unit according to claim 1, wherein each output connection of a first switching unit, within the first switching stage, is connected to an input connection of one switching unit, within the third switching stage.

5. Three stage switching unit according to claim 1, wherein the number of input connections and the number of output connections of every switching unit, within the third switching stage, is selected to correspond to the number of switching units within said first and second switching stages.

6. Three stage switching unit according to claim 3, wherein the switching units within said first switching stage, said second switching stage and/or said third switching stage are structured as a switching matrix.

7. Three stage switching unit according to claim 3, wherein the switching units within said first switching stage, said second switching stage and/or said third switching stage are structured as three stage switching units.

8. Three stage switching unit according to claim 1, wherein the outgoing optical conductors, belonging to said third switching stage, are equipped with a unit to separate optical signals, where the outgoing conductors of said unit, corresponding to the outgoing conductors of said third switching stage, are each connected to one opto-electrical converter which in turn are each connected with one input connection of said second switching stage.

9. Three stage switching unit according to claim 1, wherein every switching unit, within the third switching stage, is able to directly receive optical signals, appearing on each of a number of group related incoming optical conductors, and is able to pass on optical pulses appearing on an incoming conductor, by means of a control signal generated by the control unit in order to point out a connecting path, to one of several available selected outgoing optical conductors.

10. Three stage switching unit according to claim 1, wherein a first switching stage, structured as an input circuit, is adapted to a total maximum bit rate of more than 50 Gb/s.

11. Three stage switching unit according to claim 1, wherein through said control unit is an electro-optical converter adapted to transmit optical pulses with a first wavelength and an electro-optical converter, belonging to an other, or the same, input circuit, is adapted to transmit pulses of another wavelength.

12. Three stage switching unit according to claim 2, wherein said first switching stage consists of a number of switching units, each able to present the same number of outgoing conductors, said second switching stage consists of a number of switching units, each able to present the same number of incoming conductors; said third switching stage including a number of switching units, each able to present the same number of incoming conductors as outgoing conductors and wherein the number of outgoing conductors from a switching unit within the first switching stage is selected to correspond to the number of switching units within the third switching stage.

13. Three stage switching unit according to claim 2, wherein the outgoing optical conductors, belonging to said third switching stage, are equipped with a unit intended to separate optical signals, where the outgoing conductors of said unit, corresponding to the outgoing conductors of said third switching stage, are connected to one opto-electrical converter each which in turn is connected with one input connection each of said second switching stage.

14. Three stage switching unit according to claim 3, wherein the outgoing optical conductors, belonging to said third switching stage, are equipped with a unit intended to separate optical signals, where the outgoing conductors of said unit, corresponding to the outgoing conductors of said third switching stage, are connected to one opto-electrical converter each which in turn is connected with one input connection each of said second switching stage.

15. Three stage switching unit according to claim 12, wherein the outgoing optical conductors, belonging to said third switching stage, are equipped with a unit intended to separate optical signals, where the outgoing conductors of said unit, corresponding to the outgoing conductors of said third switching stage, are connected to one opto-electrical converter each which in turn is connected with one input connection each of said second switching stage.

16. Three stage switching unit according to claim 4, wherein the outgoing optical conductors, belonging to said third switching stage, are equipped with a unit intended to separate optical signals, where the outgoing conductors of said unit, corresponding to the outgoing conductors of said third switching stage, are connected to one opto-electrical converter each which in turn is connected with one input connection each of said second switching stage.

17. Three stage switching unit according to claim 5, wherein the outgoing optical conductors, belonging to said third switching stage, are equipped with a unit intended to separate optical signals, where the outgoing conductors of said unit, corresponding to the outgoing conductors of said third switching stage, are connected to one opto-electrical converter each which in turn is connected with one input connection each of said second switching stage.

18. A switching device for use in an ATM-System comprising:
- a plurality of incoming group related conductors;
- a plurality of outgoing group related conductors;
- a first switching stage including electro-optical converters for connecting to the incoming group related conductors;
- a second switching stage including electro-optical converters for connecting to the outgoing group related conductors;
- an intermediate switching stage connected by optical conductors between the first switching stage and the second switching stage; and
- a control unit connected to the first, second and intermediate switching stages for controlling the connection of the group related incoming conductors with the group related outgoing conductors by a connection path established through the intermediate switching stage allowing the intermediate switching stage to transfer optical information-carrying signals through the connection path, wherein the control unit activates and establishes the connecting path through intermediate switching stage based on a required bandwidth of a call, maintains the connection path during a complete information transmitting sequence and terminates the connecting by the end of a sequence.

19. The switching device of claim 18, wherein all ATM-cells with a predetermined address and bandwidth requirement appearing on any of the incoming conductors to a switching unit of the first switching stage are connected to a selected outgoing conductor related to the first switching stage.

20. The switching device of claim 18, wherein the first switching stage includes a number of switching units each able to present the same number of outgoing conductors; the second switching stage includes a number of switching units each able to present the same number of incoming conductors; and the intermediate switching stage includes a number of switching units, each able to present the same number of incoming conductors as outgoing conductors wherein the number of outgoing conductors from a switching unit in the first stage is selected to correspond to the number of switching units within the intermediate switching stage.

21. The switching device of claim 18, wherein the switching units of the intermediate switching stage are arranged to directly receive optical signals, appearing on each of a number of group related incoming optical conductors, and to pass on optical pulses appearing on an incoming conductor, by means of a control signal, generated by the control unit, to point out a path to an available selected outgoing optical conductor.

* * * * *